United States Patent
Koziel et al.

(10) Patent No.: US 11,139,970 B1
(45) Date of Patent: Oct. 5, 2021

(54) EFFICIENT HARDWARE ARCHITECTURE FOR HIGHLY SECURE ISOGENY-BASED CRYPTOSYSTEMS

(71) Applicant: PQSecure Technologies, LLC, Boca Raton, FL (US)

(72) Inventors: Brian Craig Koziel, Plano, TX (US); Brandon Langenberg, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/230,197

(22) Filed: Apr. 14, 2021

Related U.S. Application Data

(63) Continuation of application No. PCT/US2020/031348, filed on May 4, 2020.

(51) Int. Cl.
*H04L 9/30* (2006.01)
*H04L 9/08* (2006.01)
*H04L 9/32* (2006.01)
*H04L 9/06* (2006.01)

(52) U.S. Cl.
CPC .......... *H04L 9/3073* (2013.01); *H04L 9/0618* (2013.01); *H04L 9/0841* (2013.01); *H04L 9/3236* (2013.01)

(58) Field of Classification Search
CPC . G06F 7/582; G06F 7/72; G06F 7/725; G06F 21/602; H04K 1/00; H04L 9/0618; H04L 9/0841; H04L 9/3066–3073; H04L 9/3236–3242
See application file for complete search history.

(56) References Cited

U.S. PATENT DOCUMENTS

| | | | |
|---|---|---|---|
| 7,079,650 B1 | 7/2006 | Knudsen | |
| 2005/0041746 A1* | 2/2005 | Rosen | H04B 1/7163 375/242 |
| 2010/0020964 A1 | 1/2010 | Horie | |

OTHER PUBLICATIONS

Koziel et al. "SIKE'd Up: Fast Hardware Architectures for Supersingular Isogeny Key Encapsulation", Version: 20200411:214553 (All versions of this report) [retrieved on Jun. 29, 2020], Apr. 11, 2020, Retrieved from the internet: <URL: https://eprint.iacr.org/2019/711>pp. 1-19 (Year: 2020).*
Koziel et al. "A High-Performance and Scalable Hardware Architecture for Isogeny-Based Cryptography," DOI 10.1109/TC.2018. 2815605, IEEE, Nov. 1, 2018 [retrieved on Jun. 30, 2020], Retrieved from the internet: <URL:http://faculty.eng.fau.edu/azarderakhsh/files/2016/11/TCS12018.pdf? pp. 1-16 (Year: 2018).*

(Continued)

*Primary Examiner* — Kevin Bechtel
(74) *Attorney, Agent, or Firm* — Mark C. Johnson; Johnson Dalal

(57) ABSTRACT

A computer processing hardware architecture system in a highly secure isogeny based cryptosystem that includes at least one computer processor operably configured to target accelerating operations involved in isogenies on elliptic curves and having a secret key register operably configured to register a secret key, a pseudo-random function, and a secret message buffer, each operably written to by a 2:4 demultiplexer circuit operably configured to receive outside data in regions therein and read by a 4:2 multiplexer circuit.

7 Claims, 3 Drawing Sheets

(56) References Cited

OTHER PUBLICATIONS

Koziel et al. "SIKE'd Up: Fast Hardware Architectures for Supersingular Isogeny Key Encapsulation," Version: 20200411:214553 (All versions of this report) [retrieved on Jun. 29, 2020], Apr. 11, 2020, Retrieved from the internet: <URL: https://eprint.iacr.org/2019/711> pp. 1-19.

Koziel et al. "A High-Performance and Scalable Hardware Architecture for Isogeny-Based Cryptography," DOI 10.1109/TC.2018.2815605, IEEE, Nov. 1, 2018 [retrieved on Jun. 30, 2020], Retrieved from the internet: <URL: http://faculty.eng.fau.edu/azarderakhsh/files/2016/11/TCS12018.pdf? pp. 1-16.

* cited by examiner

EFFICIENT HARDWARE ARCHITECTURE FOR HIGHLY SECURE ISOGENY-BASED CRYPTOSYSTEMS

FIELD OF THE INVENTION

The present invention relates generally to hardware, systems, and methods directed toward isogeny-based cryptosystems, and, more particularly, relates to cryptosystems utilizing isogenies as a method to perform digital signatures or key encapsulation mechanisms such as supersingular isogeny key encapsulation or commutative supersingular isogeny Diffie-Hellman key exchange.

BACKGROUND OF THE INVENTION

Cryptology is the practice and study of techniques for secure communication in the presence of third parties called adversaries. More generally, cryptography is about constructing and analyzing protocols that prevent third parties or the public from reading private messages and includes various aspects in information security such as data confidentiality, data integrity, authentication, and non-repudiation. Applications of cryptography include electronic commerce, chip-based payment cards, digital currencies, computer passwords, and military communications. Cryptosystems are a suite of cryptographic algorithms needed to implement a particular security service, most commonly for achieving confidentiality. Due to the typical amount and time of computations required for a cryptography session, namely one utilizing post-quantum cryptography, the hardware or processing footprint is quite expansive. As such, utilizing such methods and systems is made impossible or commercially impracticable when desired for use in smaller devices, such as IoT devices.

Therefore, those known systems and methods fail to address small implementations of post-quantum cryptosystems, particularly those which utilize quadratic extension field arithmetic. As these cryptosystems have only just been gaining popularity and acceptance in the cryptographic community, implementations of arithmetic computations for cryptosystems have also made its deployment problematic. More specifically, the primary deficiency with post-quantum cryptosystems has typically been their efficiency. As such, much of the research community has focused on making high-speed implementations. These efforts, however, have resulted in the creation of systems generating large processing footprints that are often inefficient.

Therefore, a need exists to overcome the problems with the prior art as discussed above.

SUMMARY OF THE INVENTION

The invention provides a hardware, system, and method for efficiently implementing cryptosystems utilizing hard problems involving isogenies. This system is composed with a plurality of components necessary and operably configured to apply the Fujisaki-Okamoto transformation (and its variants) to isogeny-based cryptosystems. Specifically, the most general embodiment of the present invention may include an isogeny operation accelerator, secret key register, pseudo-random function, secret message buffer, and general input/output ports. By minimizing the number of multiplexers and interfacing logic, this invention achieves a small area footprint while still achieving the high security model indistinguishability under chosen ciphertext attack (or, "IND-CCA"). The spirit of this invention is to (1) provide an efficient interface between isogeny cryptosystems and other simple cryptographic primitives; (2) achieve IND-CCA security in as small area as possible; (3) allow flexibility in choice of critical components such as the pseudo-random function.

With the foregoing and other objects in view, there is provided, in accordance with the invention, a computer processing system for reducing a processing footprint in IND-CCA cryptosystems utilizing hard problems of isogenies on elliptic curves having at least one isogeny operation processor with a secret key register, pseudo-random function, secret message buffer, all inputs connected by a demultiplexer and all outputs connected by a multiplexer. There is also an XOR bridge between the pseudo-random function and secret message buffer.

In accordance with a further feature of the present invention, the isogeny accelerator is a computer processor effectively computing any isogeny on elliptic curves.

In accordance with another feature, an embodiment of the present invention includes a 2:4 demultiplexer allowing writes to the registers contained in the secret key, isogeny accelerator, pseudo-random function, or secret message buffer. Furthermore, there is a 4:2 multiplexer on the output of the architecture and a 3:2 multiplexer on the input to the pseudo-random function.

Although the invention is illustrated and described herein as embodied in a system and method for reducing the processing footprint in post-quantum cryptosystems, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
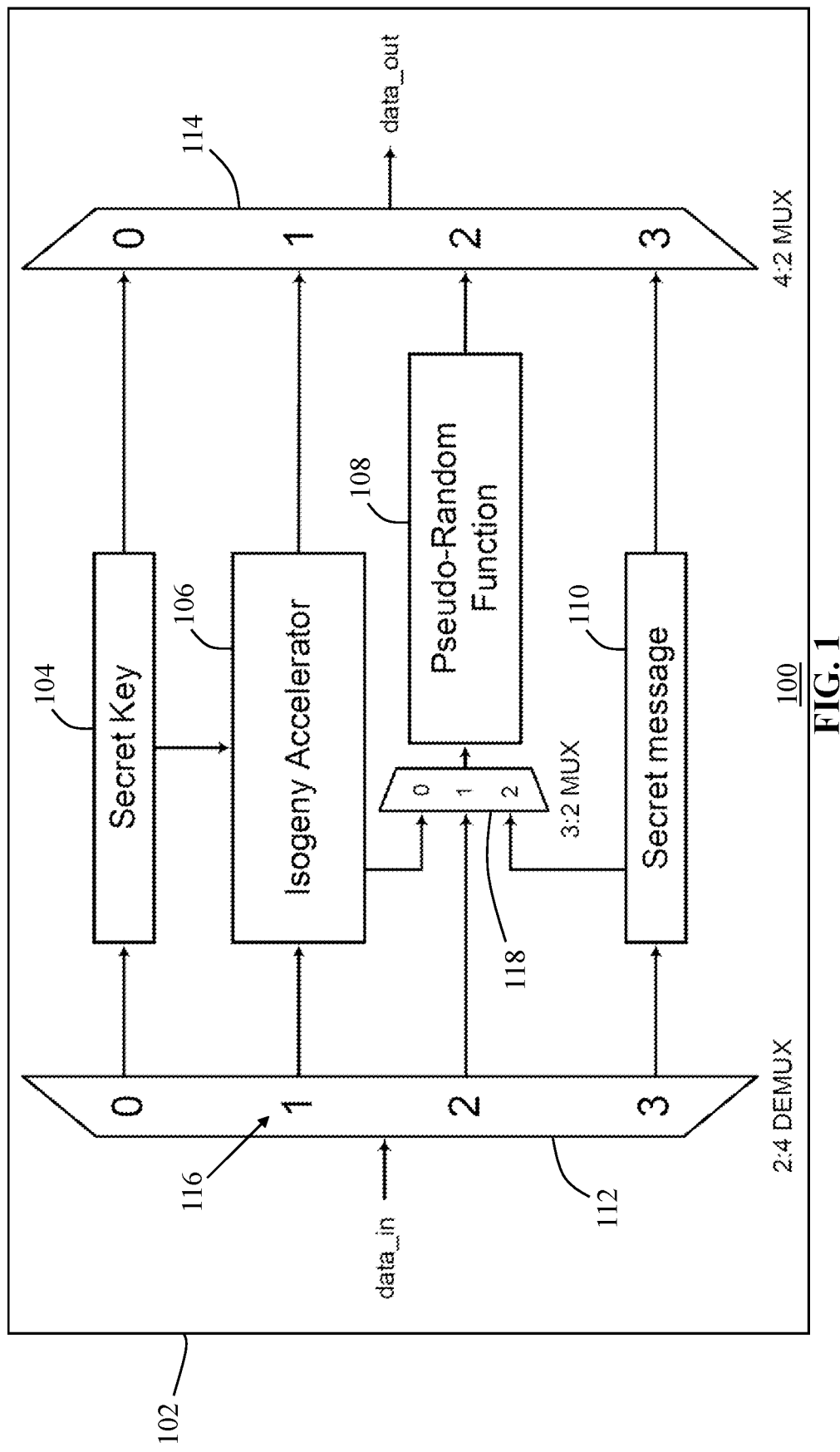
FIG. 1 is a schematic diagram depicting the general form of the isogeny-based architecture.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient hardware, system and method solution that is operably configured to implement high-security cryptosystems based on isogenies on elliptic curves. More specifically, the system is directed towards containing each essential cryptographic primitive necessary to implement IND-CCA variations of any public-key cryptosystem based on isogenies on elliptic curves. For those who are familiar with the art, the Fujisaki-Okamoto transformation can convert any weakly secure indistinguishability under chosen-plaintext attack (IND-CPA) cryptosystem into the stronger indistinguishability under chosen-ciphertext attack (IND-CCA) cryptosystem in the random oracle model. This stands as the base construction to provide more security to a cryptosystem, at the cost of a pseudo-random function ("PRF") and a secret message (that acts as additional private information). There are further, more elaborate constructions that build off the Fujisaki-Okamoto transformation to provide other security properties, such as that from Hofheinz, Hovelmanns, and Klitz.

The focus of the present invention is on cryptosystems that are protected by hard problems related to isogenies on elliptic curves. Some examples of this include, but not limited to, the supersingular isogeny Diffie-Hellman ("SIDH") key exchange protocol and the commutative supersingular Isogeny Diffie-Hellman ("CSIDH") key exchange protocol.

Figure 3:
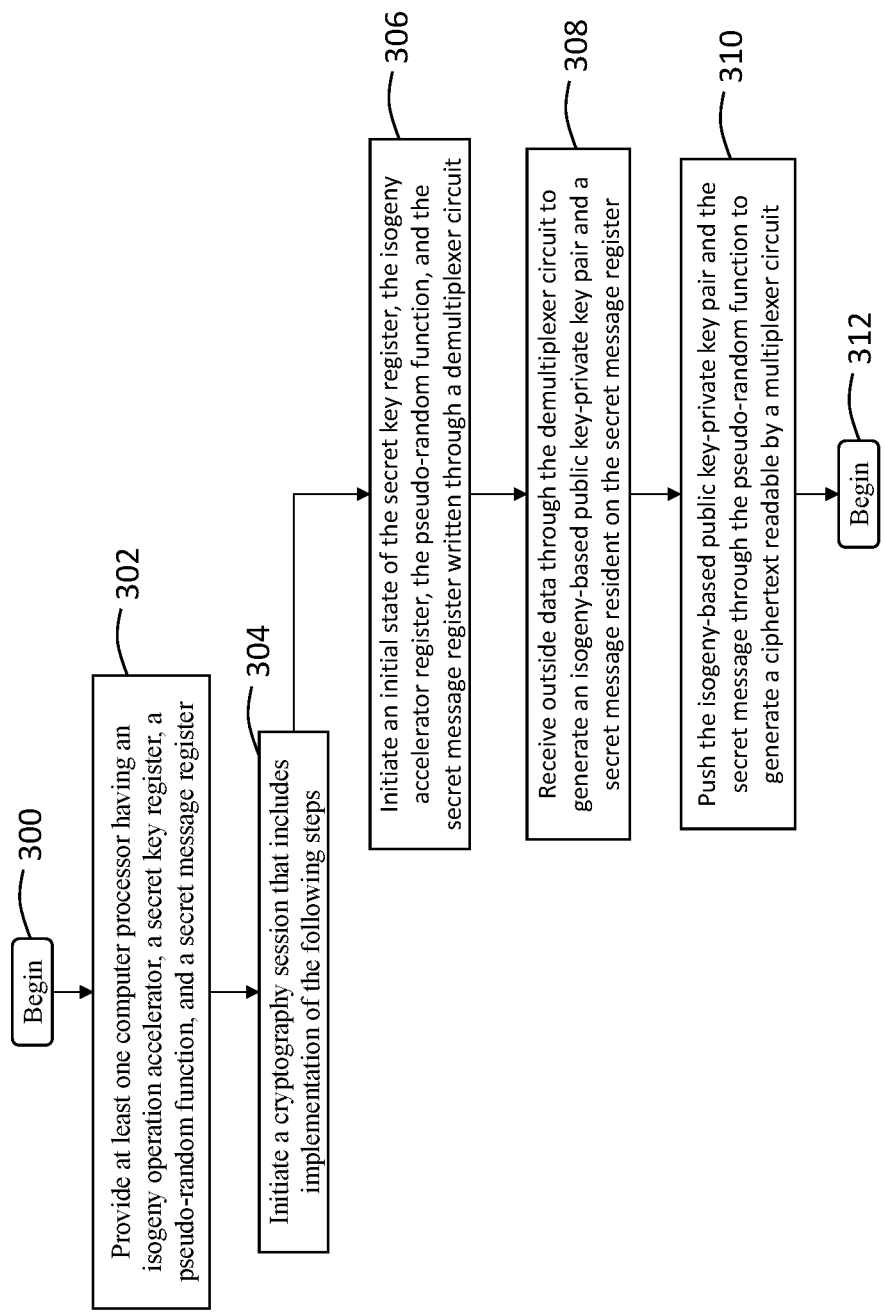
FIG. 3 is a process-flow diagram depicting an exemplary computer-implemented method for reducing a processing footprint in cryptosystems utilizing isogenies on elliptic curves.

One embodiment of the present invention is shown schematically through a block diagram in FIG. 1. FIG. 1, along with other figures herein, show a minimal design, featuring a plurality of components necessary for the Fujisaki-Okamoto transformation of isogenies on elliptic curves, all while employing minimal interfacing between these components. As such, the exemplary computer processing hardware architecture system 100 (as depicted in FIG. 1), in connection with the exemplary process (as depicted in FIG. 3), provides a plurality of primary components for reducing a processing footprint in cryptosystems utilizing isogenies on elliptic curves.

The components in the system 100 may include at least one computer processor (schematically depicted with numeral 102) operably configured to target accelerating operations involved in isogenies on elliptic curves and having a secret key register 104 operably configured to register a secret key, an isogeny accelerator 106, a pseudo-random function 108, and a secret message buffer 110. The secret key register 104, the isogeny accelerator 106, the pseudo-random function 108, and the secret message buffer 110 may be operably configured to be written to by a 2:4 demultiplexer circuit 112 operably configured to receive data in regions 116 therein and read by a 4:2 multiplexer circuit 114.

Said another way, the demultiplexer circuit or device 112 (or "DEMUX") is operably configured to take a single data input and select (analog or digital) signals of the output of the compatible and complementary multiplexer 114 (or "MUX") operably connected or implemented through the key register 104, the isogeny accelerator 106, the pseudo-random function 108, and the secret message buffer 110, and from the single data input.

As those of skill in the art will appreciate, the secret message buffer 110 is a region of a physical memory storage used to temporarily store date while it is being moved from one place to another. Typically, the data is stored in a buffer as it is retrieved from an input device or just before it is sent to an output device, although the secret message buffer 110 may be used when moving data between processes within a computer. Each of the aforementioned components 104, 106, 108, 110 can be written to with ease because of the 2:4 demultiplexer 112 on the left side of the architectural diagram in FIG. 1 and each of these can be read with the 4:2 multiplexer on the right side of the architectural diagram in FIG. 1.

In one embodiment, there may be secondary or additional multiplexer circuit 118 connected to the input of the pseudo-random function 108 as the isogeny operation accelerator result from the isogeny accelerator 106, the secret message register 110, and the outside data are all fed into the pseudo-random function to compress the information to a seemingly random bitstring, i.e., a bitstring that cannot be distinguished from a truly random one. This is done for security purposes, for example, not to leak sensitive information that could potentially threaten the security. Said another way, the 3:2 multiplexer circuit 118 may be operably configured to access the pseudo-random function 108 and operably coupled to the isogeny accelerator register 106, the secret message register 110, and the data in regions of the 2:4 demultiplexer circuit 112. In one embodiment, the pseudo-random function is beneficially of a cryptographic hash, while in another embodiment, the pseudo-random function is beneficially of symmetric cryptographic primitive. Therefore, as depicted at least from FIG. 1, the at least one computer processor 102 is operably configured to interface with an isogeny accelerator register 106 operably configured to accelerate operations involved in isogenies on elliptic curves and has a secret key register 104 operably configured to register a secret key, a pseudo-random function 108, and a secret message register; 110. The processor 102 also includes a 3:2 multiplexer circuit 118 operably configured to receive inputs from the isogeny accelerator register 106, a 2:4 demultiplexer circuit 112, and the secret message register 110, and then output data to the pseudo-random function 108. Further, the 2:4 demultiplexer circuit 112 is operably configured to receive outside data in regions 116 therein and operably configured to write to the isogeny accelerator register 106, the secret key register 104, the 3:2 multiplexer circuit 118, and the secret message register 110. The processor 102 also includes a 4:2 multiplexer circuit 114 operably configured to receive data from the isogeny accelerator register 106, the secret key register 104, the 3:2 multiplexer circuit 118, and the secret message register 110.

Figure 2:
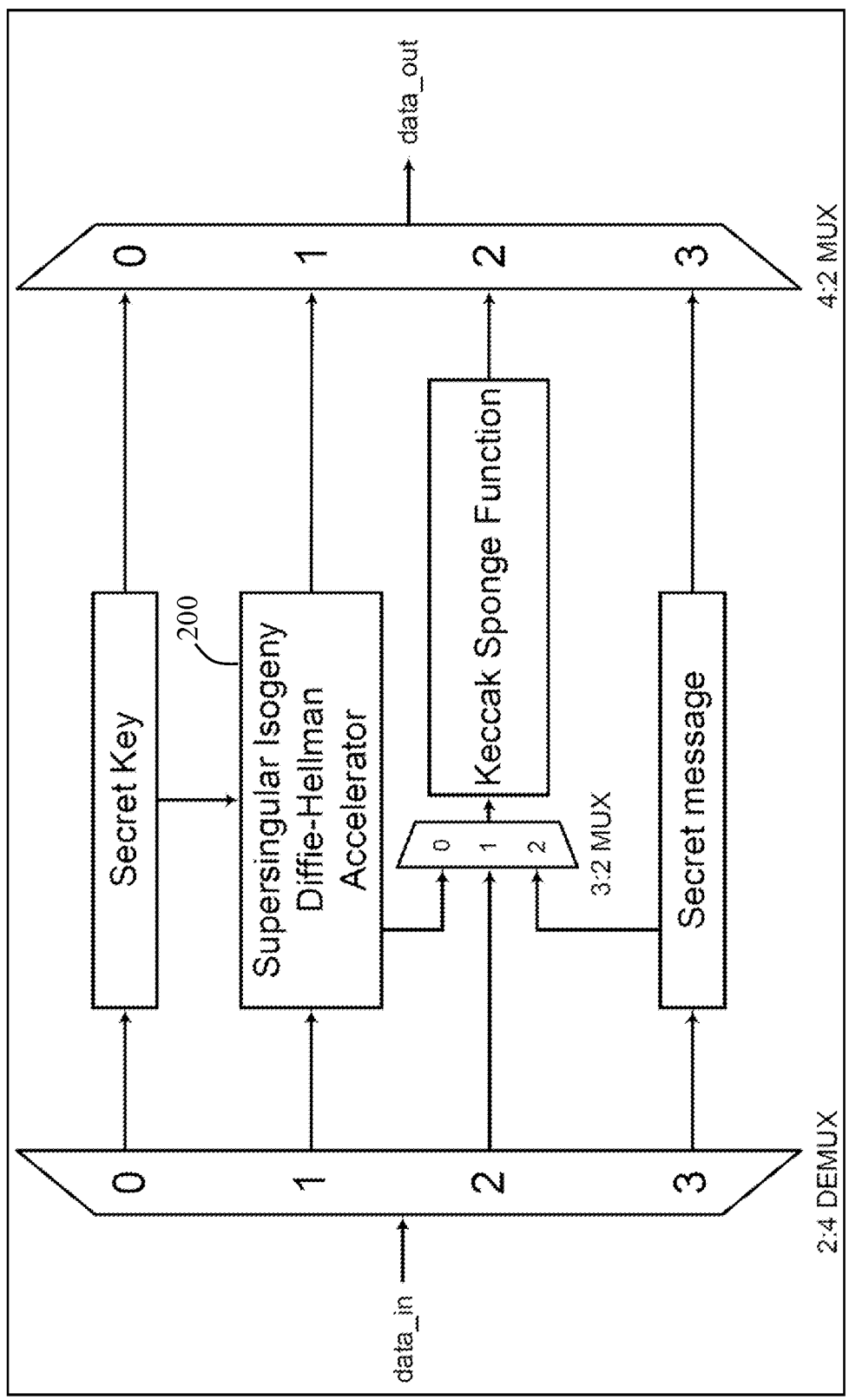
FIG. 2 is a schematic diagram depicting an instantiated form of the isogeny-based architecture targeted towards the supersingular isogeny key encapsulation ("SIKE") mechanism.

With reference to FIG. 2, another embodiment of the present invention features an explicit instantiation of the architecture depicted in FIG. 1 and for the supersingular isogeny key encapsulation (SIKE) device 200 which is an IND-CCA construction based on applying the Hofheinz, Hovelmanns, and Klitz transformation to the IND-CPA SIDH cryptosystem. Here, the pseudo-random function is of a Keccak sponge function which acts as a cryptographically secure hash function. As seen in the figures, the other components depicted in FIG. 2 are the same as those depicted in FIG. 1.

With reference to FIG. 3, a process-flow diagram depicting an exemplary computer-implemented method for reducing a processing footprint in cryptosystems utilizing isogenies on elliptic curves can be seen. The process begins at step 300 and immediately proceeds to the step 302 of providing at least one computer processor having an isogeny operation accelerator, secret key register, pseudo-random function, and a secret message register (as described above). In one embodiment, the isogeny accelerator 106 works in a prime field size above 256 bits, while in other embodiments, it may operate outside of said central processing unit ("CPU") and arithmetic logic unit ("ALU") architectures.

Next, the process continues to step 304 of initiating, through the least one computer processor, a cryptography session. Thereafter, the cryptography session may include the step 306 of initializing an initial state of the secret key register, the isogeny accelerator register, the pseudo-random function, and the secret message register written through a demultiplexer circuit. Next, step 308 may include receiving outside data through the demultiplexer circuit to generate an isogeny-based public key-private key pair and a secret message resident on the secret message register. Next, step 310 includes pushing the isogeny-based public key-private key pair and the secret message through the pseudo-random function to generate a ciphertext readable by a multiplexer circuit. The process may terminate in step 312. Although FIGS. 1-2 were described in conjunction with the process flow chart of FIG. 3, an inherent and perceivable method of operation can also be gleaned from FIGS. 1-2. Although FIG. 3 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 3 for the sake of brevity. In some embodiments, some or all of the process steps included in FIG. 3 can be combined into a single process.

What is claimed is:

1. A computer processing hardware architecture system in a highly secure isogeny based cryptosystems comprising:
    at least one computer processor:
        configured to interface with an isogeny accelerator register configured to accelerate operations involved in isogenies on elliptic curves;
        having a secret key register configured to register a secret key, having a pseudo-random function, and having a secret message register;
        having a 3:2 multiplexer circuit configured to receive inputs from the isogeny accelerator register, a 2:4 demultiplexer circuit, and the secret message register, and output data to the pseudo-random function;
        with the 2:4 demultiplexer circuit configured to receive outside data in regions therein and configured to write to the isogeny accelerator register, the secret key register, the 3:2 multiplexer circuit, and the secret message register; and
        having a 4:2 multiplexer circuit configured to receive data from the isogeny accelerator register, the secret key register, the pseudo-random function, and the secret message register.

2. The computer processing system according to claim 1, wherein:
    the pseudo-random function is of a cryptographic hash or symmetric cryptographic primitive.

3. The computer processing system according to claim 1, wherein:
    the pseudo-random function is configured to compress a received isogeny operation accelerator result from the isogeny accelerator register, data stored on the secret message register, and the outside data in regions of the demultiplexer circuit to generate a seemingly random bitstring readable by the 4:2 multiplexer circuit.

4. The computer processing system according to claim 1, wherein:
    the pseudo-random function is configured to compress an isogeny operation accelerator result from the isogeny accelerator register, data stored on the secret message register, and the outside data in regions of the demultiplexer circuit to generate a seemingly random bitstring readable by the 4:2 multiplexer circuit.

5. A computer-implemented method for reducing a processing footprint in cryptosystems utilizing isogenies on elliptic curves comprising the steps of:

providing at least one computer processor having a secret key register, an isogeny operation accelerator register, a pseudo-random function, and a secret message register operably couplable to one another;

providing a 3:2 multiplexer circuit configured to write to the pseudo-random function and configured to receive data from an isogeny operation accelerator register, the secret message register, and outside data in regions of a 2:4 de multiplexer circuit configured to write to the secret key register, the isogeny operation accelerator register, the pseudo-random function, and the secret message register;

providing a 4:2 multiplexer circuit configured to receive data from the isogeny operation accelerator register, the secret key register, the pseudo-random function, and the secret message register; and initiating, through the least one computer processor, a cryptography session that includes:

initializing an initial state of the secret key register, the isogeny accelerator register, the pseudo-random function, and the secret message register written through a demultiplexer circuit;

receiving outside data through the demultiplexer circuit to generate an isogeny-based public key-private key pair and a secret message resident on the secret message register; and pushing the isogeny-based public key-private key pair and the secret message through the pseudo-random function to generate a ciphertext readable by a multiplexer circuit.

6. The computer-implemented method according to claim 5, wherein:

the pseudo-random function is of a cryptographic hash or symmetric cryptographic primitive.

7. The computer-implemented method according to claim 5, wherein:

compressing, by the pseudo-random function, an isogeny operation accelerator result received from the isogeny accelerator, data stored on the secret message register, and the outside data in regions of the demultiplexer circuit to a seemingly random bitstring readable by the 4:2 multiplexer circuit.

* * * * *